(12) United States Patent
Mondal et al.

(10) Patent No.: US 8,107,544 B2
(45) Date of Patent: Jan. 31, 2012

(54) METHOD AND APPARATUS FOR FEEDBACK IN CLOSED LOOP TRANSMITTING

(75) Inventors: Bishwarup Mondal, Rolling Meadows, IL (US); Robert M. Harrison, Grapevine, TX (US); Timothy A. Thomas, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 857 days.

(21) Appl. No.: 12/060,301

(22) Filed: Apr. 1, 2008

(65) Prior Publication Data

US 2008/0285667 A1 Nov. 20, 2008

Related U.S. Application Data

(60) Provisional application No. 60/938,220, filed on May 16, 2007.

(51) Int. Cl.
*H04K 1/10* (2006.01)

(52) U.S. Cl. ........ 375/260; 375/262; 375/267; 375/295; 375/316; 375/346; 375/347; 375/349

(58) Field of Classification Search .......... 375/260, 375/262, 267, 295, 316, 346, 347, 349; 370/203, 370/204, 205, 206, 207, 208, 209, 210; 455/132, 455/504
See application file for complete search history.

(56) References Cited

U.S. PATENT DOCUMENTS

| | | | |
|---|---|---|---|
| 6,859,503 B2 | 2/2005 | Pautler et al. | |
| 6,927,728 B2 | 8/2005 | Vook et al. | |
| 7,139,328 B2 | 11/2006 | Thomas et al. | |
| 2006/0270360 A1 | 11/2006 | Han et al. | |
| 2007/0191066 A1* | 8/2007 | Khojastepour et al. | .... 455/562.1 |
| 2008/0272953 A1* | 11/2008 | Zheng et al. | ................... 341/173 |
| 2008/0273612 A1* | 11/2008 | Khojastepour et al. | ....... 375/260 |

FOREIGN PATENT DOCUMENTS

WO 2006029261 A1 3/2006

OTHER PUBLICATIONS

Love, David J. et al.: Limited Feedback Unitary Precoding for Spatial Multiplexing Systems, IEEE Transactions on Information Theory, vol. 51, No. 8, Aug. 2005, pp. 2967-2976.
Love, David J. et al.: Grassmannian Beamforming for Multiple-Input Multiple-Output Wireless Systems, IEEE Transactions on Information Theory, vol. 49, No. 10, Oct. 2003, pp. 2735-2747.
Klappenecker, Andreas et al.: Constructions of Mutually Unbiased Bases, arXiv:guant-ph/0309120v1, Sep. 15, 2003, pages all.

(Continued)

*Primary Examiner* — Dhaval Patel

(57) ABSTRACT

A method an apparatus is described for providing feedback for closed-loop transmitting with multiple transmit and receive antennas. The method includes a first step 900 of providing a codebook containing sets of weightings for each data stream of the multiple transmit antennas with each set identified by an index known to a transmitter and a receiver. The same codebook is utilized for any number of data streams up to the number of transmit antennas. A next step 902 includes measuring a composite channel between the transmitter and receiver. A next step 904 includes determining at least one performance metric for each set of weightings in the codebook. A next step 906 includes selecting preferred weightings for each data stream in response to the performance metrics. A next step 908 includes feeding back an index of the preferred weightings to the transmitter for use in subsequent transmissions.

11 Claims, 7 Drawing Sheets

OTHER PUBLICATIONS

Hochwald, M. Bertrand et al.: Systematic Design of Unitary Space-Time Constellations, IEEE Transactions on Information Theory, vol. 46, No. 6, Sep. 2000, pp. 1962-1973.

3GPP TSG Ran WG1#48, R1-070730, Precoding Codebook Design for 4 Node-B Antenna, Texas Instruments, St. Louis, Feb. 12-Feb. 16, 2007, pp. 1-8.

* cited by examiner

C(1) = RANK-1 CODEWORDS    C(2) = RANK-2 CODEWORDS

US 8,107,544 B2

METHOD AND APPARATUS FOR FEEDBACK IN CLOSED LOOP TRANSMITTING

FIELD OF THE INVENTION

The present invention relates generally to wireless communication systems, and in particular, to a method and apparatus for providing feedback in closed loop transmission systems.

BACKGROUND OF THE INVENTION

Wireless communication system transmission methods have evolved to include multiple transmit antennas and multiple receive antennas in order to greatly increase the link capacity of wireless communication systems and/or to better focus the transmitted energy at the receiver for greater efficiency and less interference. An antenna array is a group of spaced apart antennas that each transmit an antenna signal that has a specific gain and phase relationship with the other antenna signals. When the antennas work together transmitting the antenna signals, they produce an antenna pattern that is more focused on the receiver than a pattern produced by a single antenna. Note that the process of changing the gain and phase of a signal to produce antenna signals may be referred to as "weighting" the signal using a set of "antenna array weights." Because antenna arrays may similarly be used at a receiver to improve signal quality, use of antenna arrays at both the transmitter and receiver has been proposed. When multiple antennas are used at the transmitter and receiver, the wireless channel between them may be referred to as a multiple-input, multiple-output (MIMO) channel. Obviously, determining how to feed signals to the multiple transmit antennas and receive signals from the multiple receive antennas becomes quite complicated.

Various transmission strategies require the transmit antenna array to have some level of knowledge concerning the channel response between each transmit antenna element and each receive antenna element, and are often referred to as "closed-loop" MIMO. Obtaining full broadband channel knowledge at the transmitter is possible using techniques such as uplink sounding in Time Division Duplexing (TDD) systems and channel feedback in either TDD or Frequency Division Duplexing (FDD) systems. Limited feedback methods like feeding back an antenna selection indicator or codebook-based beamforming weights selection can reduce the amount of feedback as opposed to full channel feedback, which would require a significant amount channel resources thereby reducing the link capacity.

One solution is to provide a set of pre-coded beamforming weights that can be agreed upon between a transmitter and receiver. The set of pre-coded weights can be identified by an index. In this way, only an index need be used in feedback to the transmitter in order for the transmitter to know the proper pre-coded weights to use. However, it is difficult to provide an indexed codebook of weights that can cover all transmission conditions and number of antennas. Therefore, some calculation is still needed. Unfortunately, existing codebooks are quite complex, with weights for each index comprising a matrix of a rank of up to the number of antenna elements (the rank means the number of data streams that are to be transmitted). Given that existing matrices can contain entries with unconstrained values (i.e. alphabet) determining weights from a matrix of a particular rank still requires a number of involved calculations, which can include more complex math including matrix multiplications. Moreover, different codebooks are provided for different ranked weights, and the computational complexity of a search for determination of pre-coded weights create a problem.

Thus an efficient feedback method is needed to provide a selection of beamforming weights to the transmitter. It would be of benefit to provide a codebook that reduces computational complexity. It would be of further benefit to provide one codebook that can be used independent of rank.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

Figure 1:
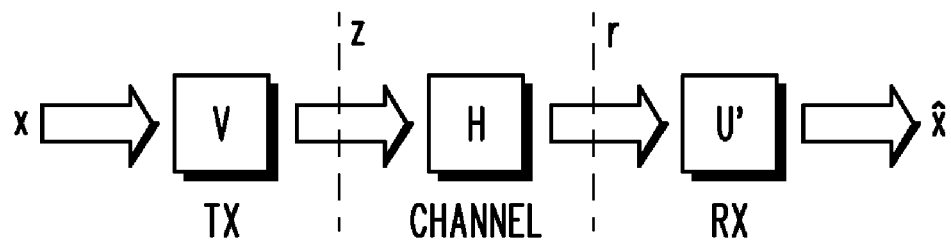
FIG. 1 is a high-level schematic diagram of a communications channel, wherein a portion of the communications channel is wireless.

The present invention provides an efficient feedback method to provide a selection of beamforming weights for a transmitter. In particular, the present invention provides a codebook that reduces computational complexity. Moreover, the present invention provides one codebook for the transmitter that can be used independent of rank.

Multiple antenna wireless systems employ codebook-based feedback to customize the signal transmission to particular channel conditions. The two most important metrics for evaluating a codebook-based method are FER/throughput performance and codebook search complexity (for quantization) at the mobile. In the preferred embodiment of the present invention, simple codebooks are proposed where the codebook entries are composed from powers of i where i is the square root of −1. In the preferred embodiment the powers of i are limited to half integer powers of i. This simplifies codebook search by substituting multiplications with conjugations or negations. Simulation results, shown below, demonstrate that such codebooks provide almost no loss in throughput performance compared to the best known codebooks. In another embodiment of the present invention, the entries of the codebook are still from a finite alphabet which helps lower the computational complexity of the codebook search, but the entries are more than just powers of i. For example the entries could include 0 (zero) and powers and sums of i where one particular example is the set {0, 1, −1, i, −i, (1+i)/sqrt(2), (1−i)/sqrt(2), (−1+i)/sqrt(2), (−1−i)/sqrt(2)} where sqrt(2) means the square root of 2. Note that this example is set contains 0 and the following integer and half integer powers of i: {0, 2, 1, 3, 1/2, 7/2, 3/2, and 5/2}.

Additionally, another structure in the present invention that makes implementation easier is to have one codebook matrix that is rank independent (rank meaning the number of transmitted data streams). The present invention also describes methods for the design of codebook matrices where rank 1 codewords are subsets of the rank 2 codewords, the rank 2 codewords are subsets of the rank 3 codewords, and so on. The rank-independent codebook design can be combined with limiting the codebook entries to powers of i (or other similar finite alphabets) so that computational complexity is further reduced. Simulation results, show below, demonstrate that these codebooks also provide almost no loss in throughput performance compared to the best known prior art codebooks.

In the present invention, the communication system may utilize an Orthogonal Frequency Division Multiplexed (OFDM) or multicarrier based architecture including Adaptive Modulation and Coding (AMC). The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. However, alternate embodiments of the communication system may utilize other cellular communication system protocols such as, but not limited to, TDMA, direct sequence CDMA, cyclic prefix single carrier systems, interleaved frequency division multiple access systems.

FIG. 1 shows a high-level schematic diagram of a wireless communications channel. As shown, x represents user data that will be wirelessly transmitted to the receiver. At the receiver, x̂ represents as an estimate of the data transmitted, x. User data x may be split in the transmitter to produce a vector that represents multiple data streams, $x_1, x_2, \ldots x_N$.

User data x is processed by matrix V to produce adaptive array antenna signals z. Each column of matrix V is a vector containing an antenna array weight set used to transmit one of the data streams $x_i$. Signals z are wirelessly transmitted from antenna elements of a transmit antenna array, and received at a receiver antenna array as received antenna signals r. The air interface or channel between antenna signals z and received antenna signals r includes matrix H, which describes the effects of the air interface or channel on signals z.

Received antenna signals r are processed in the receiver by matrix U' to produce the estimate of data, x̂.

Figure 2:
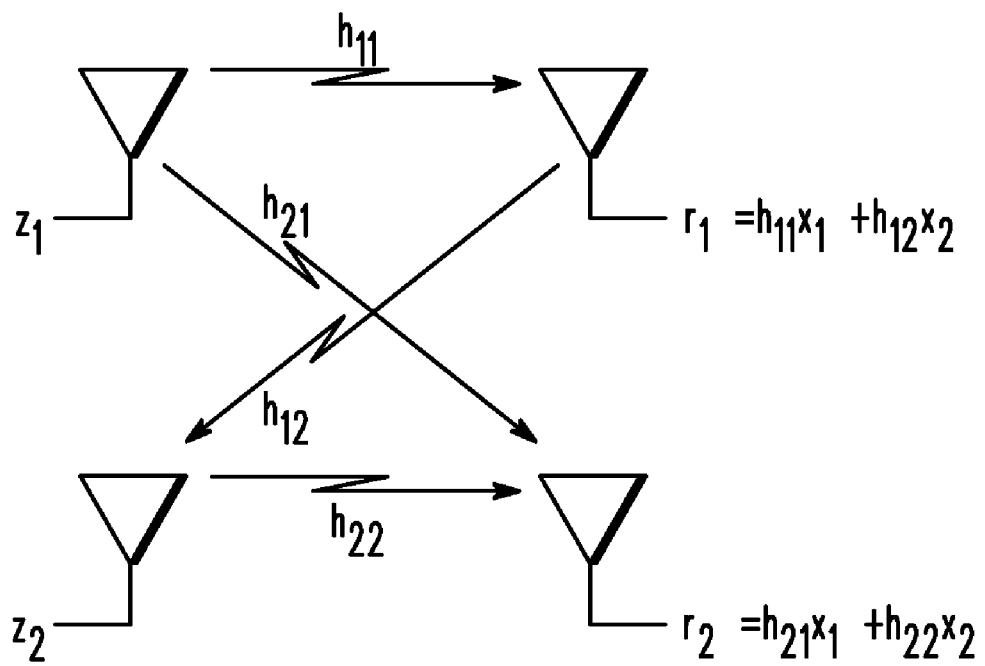
FIG. 2 is a high-level block diagram of a two-input, two-output MIMO channel.

With reference now to FIG. 2, there is depicted a two-input, two-output MIMO antenna array system, although it should be recognized that the present invention is not limited to a two antenna system, and can be applied equally well to a plurality of transmit and receive antennas. This MIMO system in this example is used to simultaneously transmit two different data streams, $z_1$ and $z_2$, to a single subscriber unit through a "composite channel" H, defined by the matrix $$H = \begin{bmatrix} h_{11} & h_{12} \\ h_{21} & h_{22} \end{bmatrix}$$

where $h_{mn}$, m=1,2, n=1,2 are complex channel values. Note that the term "composite channel" as used herein refers to a complete measurement or description of a channel, wherein the effects of all combinations of transmit antennas and receive antennas are considered. The composite channel may be thought of as the aggregation of all channels between arrays of single antennas, defined by all pair-wise combinations of transmit and receive antennas.

When a flat Rayleigh fading channel is assumed, $h_{mn}$ are complex-valued Gaussian numbers with unity average power, $E[h_{mn}h_{mn}^*]=1$. The received (baseband) vector r (see FIG. 1) is ideally written as follows $$r=Hz=HVx$$

where $x=[x_1 \ x_2]^T$ is the vector of transmitted data streams, and noise is not considered. Note that in a noise free channel, both streams can be recovered perfectly if channel matrix HV is full rank. That is, two equations and two unknowns can be solved to recover the unknowns $x=[x_1 \ x_2]^T$. When $x=(HV)^{-1}r$, both data streams can be recovered and link, or channel, efficiency can be doubled.

Figure 3:
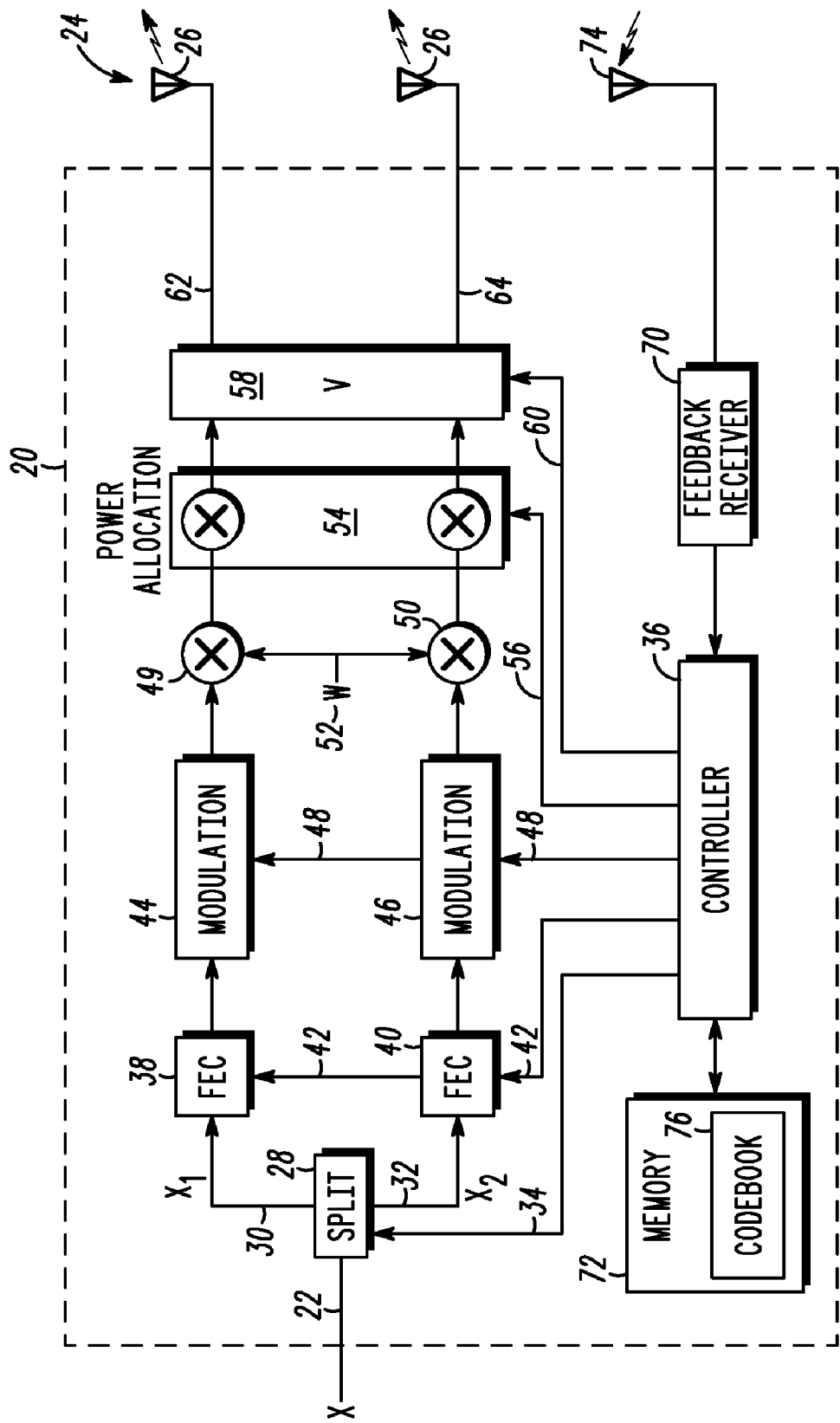
FIG. 3 is a block diagram of a multiple-stream, multiple-antenna transmitter that may be used to implement the method and system of the present invention.

With reference now to FIG. 3, there is depicted a multiple-stream, multiple-antenna closed-loop transmitter that may be used to implement the method and system of the present invention. As illustrated, transmitter 20 receives user data 22 and transmits the processed user data using antenna array 24, which comprises antenna elements 26.

User data 22 enters data splitter 28, which separates the user data stream into a plurality of data streams, such as data stream 30 and data stream 32. While two data streams are shown in FIG. 3, data splitter 28 may produce any number of data streams. Data splitter 28 splits data in proportion to control signal 34, which is produced by controller 36. For example, control signal 34 may specify a ratio of 2-to-1, wherein two bits are sent to data stream 30 and one bit is sent to data stream 32. This splitting ratio may specify an equal number of bits on both streams, or all data bits are sent to one stream.

Data streams 30 and 32 output by data splitter 28 are input into forward error correction encoders (FEC) 38 and 40. These error correction encoders may be implemented with a convolutional encoder, a turbo encoder, a block encoder, or the like. The type of encoding, and the rate of encoding is controlled by control signal 42, which is output by controller 36. Note that control signal 42 may set error correction encoders 38 and 40 to the same error encoding schemes, or different encoding schemes.

Outputs of error correction encoders 38 and 40 are coupled to inputs of modulators 44 and 46. Modulators 44 and 46 may be implemented with linear or non-linear modulation schemes, including all varieties of modulators that modulate amplitude and phase, and combinations of amplitude and phase. Examples of modulators that may be used include Binary Phase Shift Keying modulators (BPSK), Quadrature Phase Shift Keying modulators (QPSK), M-ary phase shift keying modulators, M-ary quadrature amplitude modulators (MQAM), and the like.

Control signal 48 selects the type of modulation used in modulators 44 and 46. Control signal 48 is produced by controller 36. According to the present invention, the modulation schemes in the data streams may be the same, or different.

The output of modulators 44 and 46 are coupled to inputs of optional spreaders 49 and 50, respectively. Spreaders 49 and 50 spread the signal using spreading code 52, wherein the spreading code is assigned to user data 22.

Outputs of spreaders 49 and 50 are coupled to inputs of power allocator 54. Power allocator 54 sets a power ratio between data streams 30 and 32 in response to control signal 56 from controller 36. Power allocator 54 may allocate all power to one data stream, equal powers on data streams, or other ratios of unequal power allocations. Power allocator 54 does not allocate power to data streams 30 and 32 relative to data streams belonging to other user data not shown in FIG. 3. This means that power allocator 54 does not allocate an absolute level of power to a user. The absolute power allocated to each data stream, and each user, is determined by available power in power amplifiers and other control functions not shown in FIG. 3.

Outputs of power allocator 54 are coupled to inputs of antenna array signal processor 58, which further processes the data streams by applying antenna array weight sets to each data stream. These antenna array weight sets come from controller 36 via control signal 60. By applying the antenna array weight sets to data streams 30 and 32, antenna array signal processor enables the transmission of each data stream with a different antenna array beamforming pattern.

The outputs of antenna array signal processor 58 include weighted components of the input data streams. For example, output 62 may include a phase-and-gain weighted portion of data stream 30 added together with a phase-and-gain weighted portion of data stream 32. The number of weighted outputs from antenna array signal processor 58 is equal to the number of transmit antennas. While the number of outputs of antenna array signal processor 58 may be greater than the number of data streams input, the number of data streams transmitted remains the same.

Figure 4:
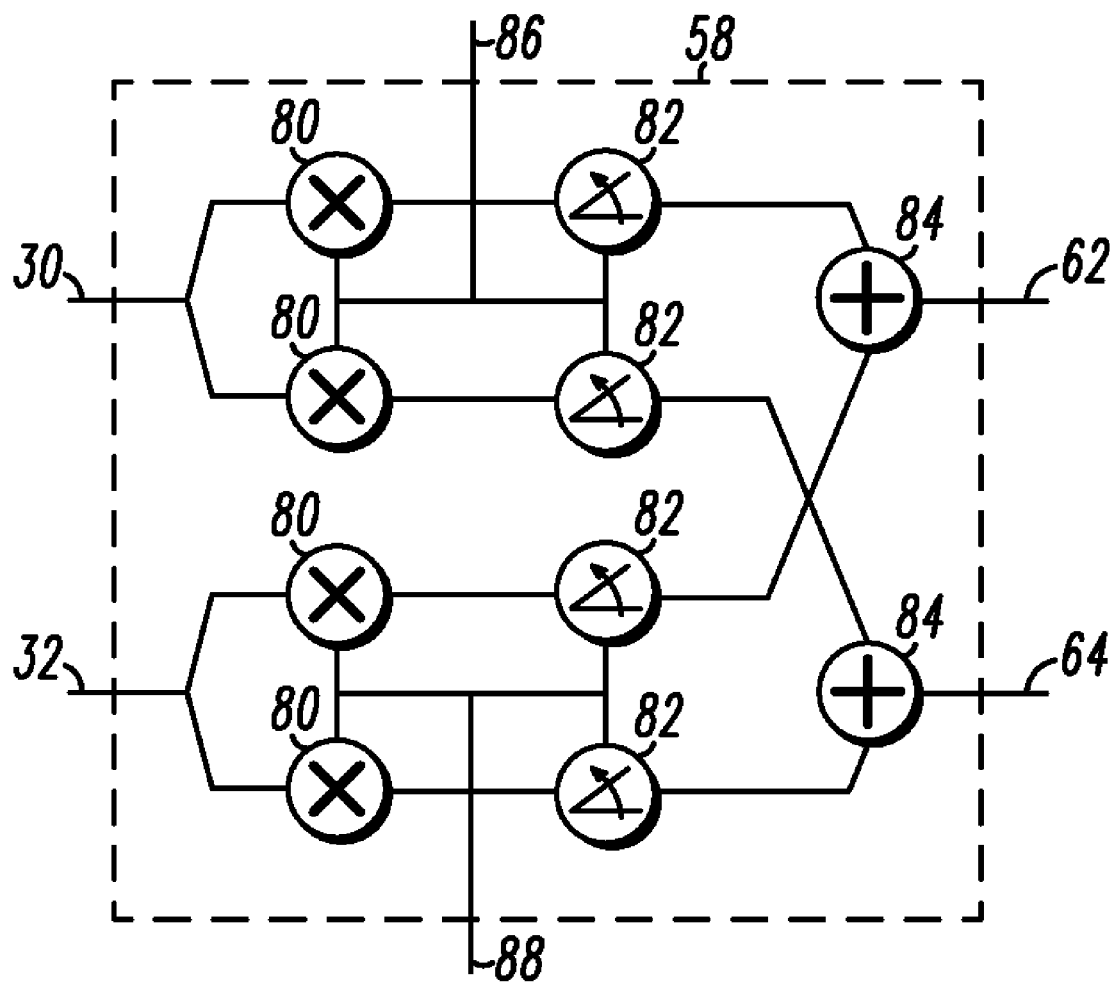
FIG. 4 is a more detailed block diagram of antenna array signal processor.

With reference now to FIG. 4, there is depicted a high-level block diagram of antenna array signal processor 58. As shown, data streams 30 and 32 enter antenna array signal processor 58, wherein a copy of each data stream is sent to a gain multiplier corresponding to an antenna element that will be used in an antenna array. In the example shown in FIG. 4, two antennas will be used in the antenna array, therefore copies of each data stream are sent to two gain multipliers 80.

Following each gain multiplier 80 is a phase shifter 82, which rotates the phase of the signal according to a control signal input. Outputs of phase shifters 82 are coupled to summers 84, which add the weighted data streams to produce output signals 62 and 64.

Control signal 60 (see FIG. 3) includes a plurality of antenna array weight sets, wherein one antenna array weight set is associated with each data stream. For example, control signal 60 includes weight set signals 86 and 88. Weight set signal 86 includes gain and phase weights (i.e., complex weights) for each gain multiplier 80 and phase shifter 82 associated with data stream 30. Thus, the outputs of phase shifters 82 associated with data stream 30 produce antenna signals that provide a selected antenna pattern for data stream 30. Similarly, weight set signal 88 includes phase and gain weights for each gain multiplier 80 and phase shifter 82 associated with data stream 32. In the outputs of phase shifters 82 associated with data stream 32 produce antenna signals for driving an antenna array with a selected pattern for data stream 32.

In order to produce desired antenna beamformed patterns for each data stream, gain multipliers 80 associated with a data stream may have different gain values and phase shifters 82 associated with a data stream may have different phase shift values, whereby producing antenna signals that work together to form a particular transmission pattern.

In some embodiments of transmitter 20, output signals 62 and 64 may be up-converted, amplified, and coupled to two antenna elements 26.

Controller 36 outputs control signals 34, 42, 48, 56, 60, and 68 based upon information received from feedback receiver 70, and data stored in memory 72. Feedback receiver 70 is shown coupled to antenna 74 for receiving feedback data from a remote receiver, such as the receiver shown in FIG. 5. While antenna 74 is shown separate from antenna array 24, one of the antenna elements 26 of array 24 may be used to receive the feedback data.

Feedback data from feedback receiver 70 may include a codebook index as described below, which may be used by controller 36 to lookup transmission parameters in the codebook 76 pre-stored within the memory 72.

Controller 36 may also be used to calculate, or derive, additional control signals or transmission parameters based upon feedback data. Therefore, it should be understood that feedback data may include measurements upon which calculations may be based, or data that indicates parameters to be used in transmitter 20.

Figure 5:
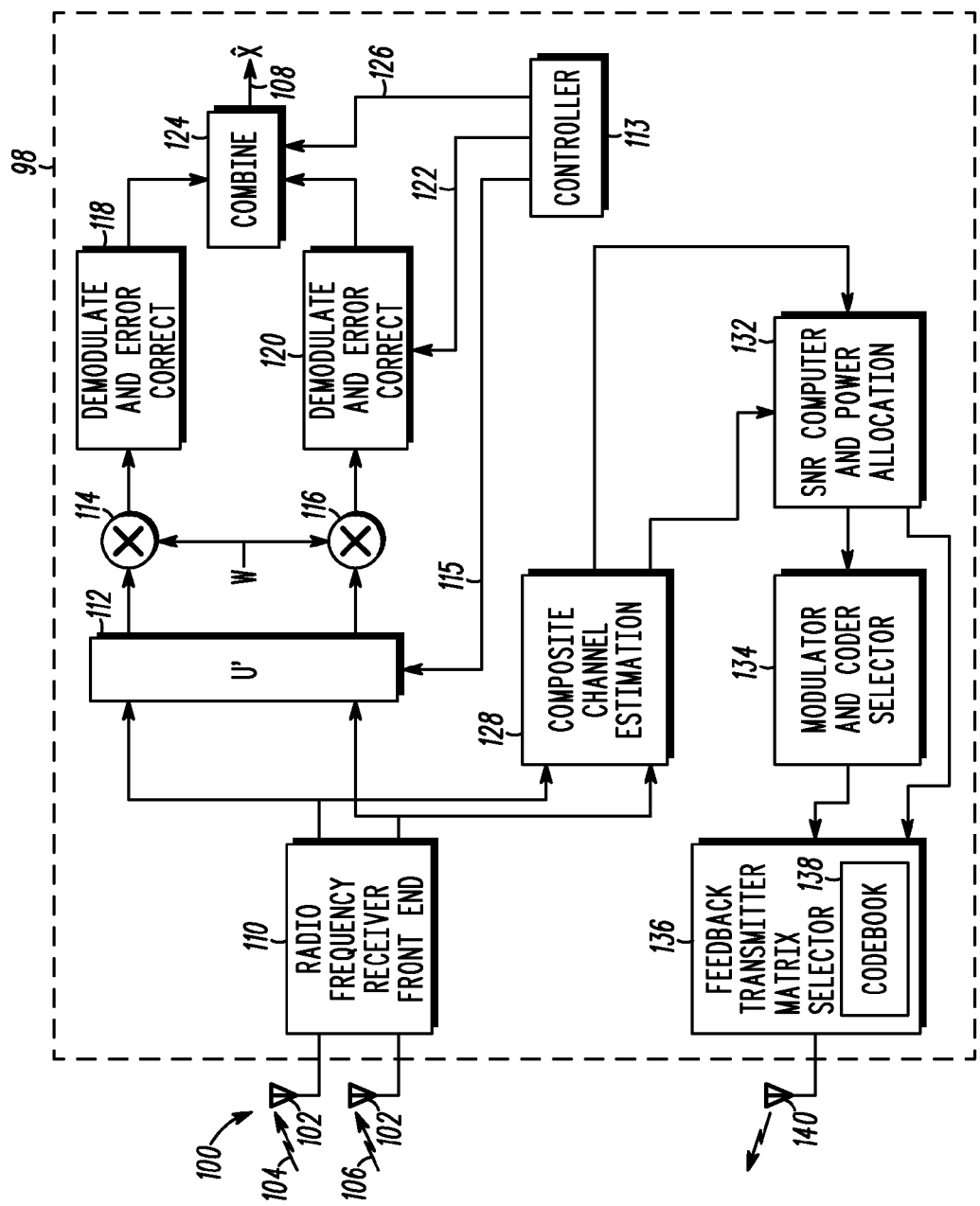
FIG. 5 depicts a receiver for use in a multiple-stream, multiple-antenna transceiver system in accordance with the method and system of the present invention.

With reference now to FIG. 5, there is depicted a receiver for use in a multiple-stream, multiple-antenna transceiver system in accordance with the method and system of the present invention. As shown, receiver 98 includes antenna array 100 having elements 102 that receive radio frequency signals 104 and 106. Received RF signals 104 and 106 are most likely different signals because antenna elements 102 are spaced apart, and propagation paths taken by received RF signals 104 and 106 from antenna elements 26 of transmitter 20 are most likely different in a multi-path fading environment.

In the multiple-stream, multiple-antenna transceiver system that is made up of transmitter 20 and receiver 98, multiple data streams are transmitted to increase the data throughput between transmitter 20 and receiver 98. Transmitter 20 is able to simultaneously transmit multiple data streams, and receiver 98 is able to keep the multiple streams separate by exploiting the differences in the channel characteristics between the multiple antennas at transmitter 20 and receiver 98. Thus, user data 22 in transmitter 20 is received by receiver 98 and output as estimated user data 108.

Received RF signals 104 and 106 are input into radio frequency receiver front end 110, wherein the radio frequency signals are down converted and digitized. The output of radio frequency receiver front end 110 is a stream of complex baseband digital samples that represent received RF signals 104 and 106.

The outputs of radio frequency receiver front end 110 are input into receiver signal processor 112, which has the function of separating data streams 30 and 32 (See FIG. 3) in receiver 98. In one embodiment of the present invention, receiver signal processor 112 may be implemented by multiplying the input signals by the complex conjugate transpose of the U matrix, which is the left singular vectors of the singular value decomposition of the composite channel matrix H. In another embodiment of the present invention, receiver signal processor 112 may be implemented by multiplying the input signals by the pseudo-inverse of the product of the composite channel matrix H with the matrix V. In yet another embodiment of the present invention, receiver signal processor 112 may be implemented by multiplying the input signals by MMSE combining weights calculated from the product of the composite channel matrix H with the matrix V. Receiver signal processor 112 is controlled by control signal 115 from controller 113.

The data streams output by receiver signal processor 112 are input to optional despreaders 114 and 116, which despread the signals using spreading code 52, which is the same spreading code used in the transmitter. The outputs of despreader 114 and 116 are coupled, respectively, to the inputs of demodulator and decoders 118 and 120. Each demodulator and decoder 118 and 120 demodulates the signal and decodes the signal using demodulation and error correction decoding techniques that complement those selected for each data stream in the transmitter. Thus, the type of demodulator and decoder functions used depends upon what was used in transmitter 20, as indicated by control signal 122 from controller 113. Demodulators and decoders 118 and 120 may be the same function, or may be different functions.

The outputs from demodulator and decoder 118 and 120 are input into combiner 124, which combines the multiple streams received back into a single stream for output as estimated user data 108. Combiner 124 operates under the control of controller 113, as directed by control signal 126. Because the received data streams may have different data rates, and because one data stream may have a data rate equal to zero, combiner 124 must reconstruct the user data in accordance with the way data was originally split by data splitter 28 in transmitter 20 in FIG. 3.

In order to control the transmission of multiple data streams via multiple antennas at the transmitter, receiver 98 must measure the composite channel and send feedback data to the transmitter. As shown, outputs of radio frequency front end 110 are also coupled to composite channel estimator 128, which uses pilot signals transmitted from each antenna element 26 in transmitter 20 to measure the composite channel between the multiple input antennas and multiple output antennas. In practice, the receiver receives the downlink pilot data and measures the downlink channel estimates from each of the transmitter's antennas to each of its receive antennas. Although the pilots are preferably transmitted by the transmitter and used by the receiver for channel estimation, alternative channel estimation techniques, such as blind or decision-directed channel estimation methods may sometimes be used in the absence of pilots or as a supplement to the pilot-based channel estimation.

The output of composite channel estimator 128, which is represented by the H matrix, is input into 132 and 136.

The SNR computer and power allocator 132, a signal-to-noise ratio is computed for each data stream hypothetically transmitted. Based upon the SNR computations, the power allocation function of block 132 allocates power to each data stream. Once power has been allocated to each data stream, final SNR calculations may be performed using the selected power allocation.

Modulator and coder 134 receives information from SNR computer and power allocator 132 that it uses to select an encoding scheme and a modulation scheme to be used in transmitter 20. Generally, higher order modulators are selected for data streams having high signal-to-noise ratios.

Feedback transmitter 136 receives information from 128, SNR computer and power allocator 132, and modulator and coder selector 134. This data represents calculations and selections made in receiver 98 that will be used to control the transmission modes of transmitter 20. In a preferred embodiment, feedback transmitter 136 analyzes the data and selects a codebook value (index and rank) and associated transmitter parameters that most closely match the transmitter parameters represented by the input data. Therefore, feedback transmitter 136 may include codebook 138 for producing a codebook value that is transmitted to transmitter 20 via antenna 140. Although antenna 140 is shown separate from receive antenna array 100, antenna 140 may be one of the antenna elements 102 in receive antenna array 100. Data transmitted by feedback transmitter 136 is received in transmitter 20 by feedback receiver 70.

In a preferred embodiment the present invention considers codebook-based feedback of channel information for enabling linear precoding (including beamforming) in MIMO systems, in a TDD or a FDD scenario. The transmitter (e.g., a base station) as well as the receiver (e.g., a mobile station) has prior knowledge of a fixed, predetermined set of precoding matrices called a codebook. The receiver, based on an estimated downlink channel, selects a particular codebook entry (a codeword) and the index of this entry is sent back to the transmitter using a low-rate feedback channel. The present invention provides codebooks that reduce the computational complexity necessary at the receiver for choosing a codeword.

A brief description of codebook formation can now be described here. Assume that the transmitter has $M_t$ antennas, the receiver has $M_r$ antennas, and that $M_s$ data-streams are to be transmitted. Let H(k) represent the $M_r \times M_t$ channel matrix for the k-th subcarrier in frequency. Let W represent a precoding matrix of dimension $M_t \times M_s$ which is an element of the codebook as defined herein (note that this W is different from the W 52 used in spreader 49 and 50 and despreaders 114 and 116). The criteria for selecting a codeword is non-unique but usually the selection criteria involve multiplications of the form H(k)W. This present invention constructs codebooks from a restricted or finite alphabet to ease search selection complexity.

A formula for selecting an element of a codebook may be expressed as $$V = \underset{W \in \Phi}{\operatorname{argmax}} \sum_{k=1}^{K} \|H(k)W\|_F^2 \qquad (1)$$

where the matrix norm is the Frobenius norm ($\|A\|_F^2$ means the sum of the squared magnitude of the entries of A), H(k) represents the $M_r \times M_t$ channel matrix for a k-th subcarrier in frequency, K denotes the size of the cluster consisting of K adjacent subcarriers, W is a precoding matrix of dimension $M_t \times M_s$, $\Phi = \{W_1, W_2, \ldots, W_N\}$ denotes the codebook of precoding matrices and V is the selected element from $\Phi$ that represents the quantized precoding matrix for the cluster. The present invention provides the construction of $\Phi$ from $\alpha$ and in general, from a restricted alphabet.

A standard and fast way of evaluating codebooks is to compute the minimum pairwise distances of all the codewords. The distance measures used are summarized below.

$$d_{min,k} = \min_{W_i, W_j, i \neq j} \frac{1}{\sqrt{2}} \|W_i W_i^H - W_j W_j^H\|_F \qquad (2)$$

where the subscript k denotes the number of streams (or rank). This distance is used for $1 \leq k \leq M_t$. The following distance is used for $k = M_t$.

$$d_{min,k} = \min_{W_i, W_j, i \neq j} \|W_i - W_j\|_F. \quad (3)$$

A codebook having a larger $d_{min,k}$ is considered to be better than a competitor codebook. The equivalence relations for certain selection criteria are as follows:

$$\underset{W}{\operatorname{argmax}} \|HW\|_F^2 = \underset{W}{\operatorname{argmin}} \|HW_\perp\|_F^2$$

$$\log_2 \det\left[I + \frac{E_s}{M_s N_0} W^H H^H H W\right] =$$

$$\log_2 \det\left[I + \frac{E_s}{M_s N_0} H^H H - \frac{E_s}{M_s N_0} H^H H W_\perp W_\perp^H\right]$$

$$\operatorname{trace}\left[I + \frac{E_s}{M_s N_0} W^H H^H H W\right]^{-1} =$$

$$r - M_r + \operatorname{trace}\left[I + \frac{E_s}{M_s N_0} H H^H - \frac{E_s}{M_s N_0} H W_\perp W_\perp^H H^H\right]^{-1}$$

where $w_\perp$ is of rank $(M_r - r)$ and denotes the orthogonal complement of $w$, where $r$ denotes the rank or the number of streams (interchangeably denoted by $M_s$). Thus, in case a simple codebook exists for $w_\perp$ and not for $w$, it is beneficial to search over codebooks consisting of $w_\perp$. Note that other distances can be used. One such alternative is to use the square root of one minus minimum squared singular value of $W_1^H W_2$.

One embodiment of the present invention provides multi-rank (rank-independent) codebook design for arbitrary alphabets. Preferably, the codebook has optimal distance for each rank. The design of codebooks with good minimum distance properties is not an exact science given the very non-linear nature of the minimum distance metric. However, a gradient-based approach can be used to iteratively design codebooks with increasing minimum distances. The first stage in this gradient-based approach is to compute rank 1 vectors with good distance properties. These rank 1 vectors will make up the first columns of the final codebook matrix design. The design of the rank 1 vectors is as follows:

1. Start with some unit-norm initial vectors $v(1)$ through $v(N)$ (e.g., randomly chosen entries) and a step size, $\alpha$ (e.g., $\alpha=0.01$).
2. Find the two vectors with the closest distance (call this pair $\{m,p\}$). The distance can be found using (2) or some suitable alternative.
3. Calculate the following gradients: $g_m = v(m)(v^H(m)v(p))$ and $g_p = v(p)(v^H(p)v(m))$.
4. Update the vectors: $v(m) = v(m) - \alpha g_m$ and $v(p) = v(p) - \alpha g_p$.
5. Enforce the unit-norm constraint as follows:

$$v(m) = \frac{v(m)}{\sqrt{v^H(m)v(m)}} \text{ and } v(p) = \frac{v(p)}{\sqrt{v^H(p)v(p)}}$$

6. If the minimum distance is improved, go back to step 2 until the minimum distance is no longer improved. Otherwise stop.

The gradient procedure can be run multiple times from different starting points to further search for a codebook with the best minimum distance. Note that to enforce other constraints such as constant modulus entries or for finite alphabet entries, step 5 can be replaced by an operation that enforces the desired constraint.

Alternatively, an approximate gradient for an arbitrary distance metric, $d(W_1, W_2)$ can be calculated. The present invention is only interested in the gradient of the last columns of $W_1$ and $W_2$, so given $W_1$ and $W_2$ with the following forms: $W_1 = [A_1, u_1]$ and $W_2 = [A_2, u_2]$, the only gradient vectors of interested for $u_1$ and $u_2$ are labeled $g_1$ and $g_2$, respectively. The $m^{th}$ element of the approximate gradients for $u_1$ and $u_2$ are found as:

$$\{g_1\}_m = (d([A_1, u_1 + \delta 1_m], W_2) - d(W_1, W_2) + i\{d([A_1, u_1 + i\delta 1_m], W_2) - d(W_1, W_2)\})/\delta$$

$$\{g_2\}_m = (d(W_1, [A_2, u_2 + \delta 1_m]) - d(W_1, W_2) + i\{d(W_1, [A_2, u_2 + i\delta 1_m]) - d(W_1, W_2)\})/\delta$$

where $1_m$ is a $M_t \times 1$ vector of all zeros except for a one in the $m^{th}$ element and $\delta$ is some suitable small number (e.g., $\delta = 0.00001$).

Once a rank 1 design is obtained, the rank 2 through $M_t$ design can be found. First the rank 1 codebook matrices are created (note that at this first step these are vectors) $W_1(1)$ through $W_1(N)$ as $W_1(n) = v(n)$.

1. Set the rank, $n=2$.
2. Start with some unit-norm initial vectors $u(1)$ through $u(N)$ (e.g., randomly chosen entries) and a step size, $\alpha$ (e.g., $\alpha\beta 0.01$).
3. Create the rank n codebook matrices as: $W_n(m) = [W_{n-1}(m), u(m)]$ for $m=1, \ldots, N$.
4. Find the two rank n matrices with the closest distance (call this pair $\{m,p\}$). The distance can be found using (2) (or (3) in the rank $n=M_t$ case) or some other suitable distance.
5. Compute an approximate gradient for each pair, $g_m$ and $g_n$ as described above.
6. Update the vectors: $u(m) = u(m) + \alpha g_m$ and $u(p) = u(p) + \alpha g_p$.
7. Enforce the unit norm constraint on $u(m)$ and $u(p)$ and also enforce the constraint that $u(m)$ and $u(p)$ is orthogonal to $W_{n-1}(m)$ and $W_{n-1}(p)$ respectively (e.g., using a Gram-Schmidt orthonormal procedure).
8. If the minimum distance is improved, go to step 3. Otherwise go to step 9.
9. If $n=M_t$, then stop, otherwise, $n=n+1$ and go to step 2.

The gradient procedure can be run multiple times from different starting points to further search for a codebook with the best minimum distance at each rank. Note that like the rank 1 case, different constraints can be substituted at step 7 (e.g., a constant modulus constraint or finite alphabet constraint).

In another embodiment, the present invention provides a multi-rank codebook designs from a reduced alphabet. In this case, a connection between codebook designs and the designs of mutually unbiased bases (MUBs) for quantum information theory is made. It turns out that a set of MUBs can be used for the construction of codebooks from a finite alphabet $\alpha = \{1, -1, i, -i\}$ consisting only powers of i. It may be noted, however, that maximal sets of MUBs are limited and can only be identified in certain dimensions which imposes restrictions on codebook sizes and dimensions. Fortunately, it appears that for most cases of practical interest it is possible to construct near-optimal codebooks from a using MUBs.

A measure of performance for a given multi-rank codebook can be defined as follows. Consider an arbitrary multi-rank codebook $\mathcal{C} = \{W_1, W_2, \ldots, W_N\}$ consisting of N elements in dimension D. Note that each element of the codebook, $W_l$ is a D×D unitary matrix. For an arbitrary element $W_l$, denote by $W_l^k$ the D×k sub-matrix of $W_l$ consisting of the first k columns of $W_l$. Define functions $d_1^*, d_2^*, \ldots, d_D^*$ as $$d_k^* = \min_{m \neq n, 1 \leq m,n \leq N} \left(\frac{1}{\sqrt{2}}\right) \left\| W_m^k (W_m^k)^H - W_n^k (W_n^k)^H \right\|_F \text{ for}$$

$$k = 1, 2, \ldots D-1 \text{ and}$$

$$d_D^* = \min_{m \neq n, 1 \leq m,n \leq N} \left\| W_m^k - W_n^k \right\|_F.$$

Then the functions $d_1^*, d_2^*, \ldots, d_D^*$ may be used to measure the performance of the codebook $\mathcal{F}$ for rank $1, 2, \ldots, D$ respectively.

To determine codebook designs from MUBs, in a D-dimensional space, two bases A and B are defined as mutually unbiased if $$<a,b> = 1/D, \qquad (4)$$

where $a \in A$, $b \in B$ and $<,>$ denotes the cosine of the angle between the two vectors a and b. It is known that D+1 such bases exist if D is a power of a prime. Specific designs for D+1 bases are known in the cases when D is a power of 2 or 3. In the particular case when D is a power of 2, it turns out that the D+1 MUBs can be constructed from the alphabet a1. Details for the design of MUBs need not mentioned since codebooks can be constructed from pre-designed MUBs.

The case of D=4 (corresponding to $M_t$=4) is of special importance and 5 MUBs (the maximum possible in this dimension) includes bases A, B, C, D given as $$A = \left(\frac{1}{2}\right)\begin{bmatrix} 1 & 1 & 1 & 1 \\ 1 & 1 & -1 & -1 \\ 1 & -1 & -1 & 1 \\ 1 & -1 & 1 & -1 \end{bmatrix}, B = \left(\frac{1}{2}\right)\begin{bmatrix} 1 & 1 & 1 & 1 \\ -1 & -1 & 1 & 1 \\ -i & i & i & -i \\ -i & i & -i & i \end{bmatrix}, \quad (5)$$

$$C = \left(\frac{1}{2}\right)\begin{bmatrix} 1 & 1 & 1 & 1 \\ -i & -i & i & i \\ -i & i & i & -i \\ -1 & 1 & -1 & 1 \end{bmatrix}, D = \left(\frac{1}{2}\right)\begin{bmatrix} 1 & 1 & 1 & 1 \\ -i & -i & i & i \\ -1 & 1 & 1 & -1 \\ -i & i & -i & i \end{bmatrix},$$

along with the standard basis. From A, B, C, D a codebook (of cardinality 16 (or 4-bits of feedback) for $M_t$=4 transmit antenna MIMO systems may be constructed as $\Phi = \{A_0, A_1, A_2, A_3, B_0, B_1, B_2, B_3, C_0, C_1, C_2, C_3, D_0, D_1, D_2, D_3\}$ where $A_j$ represents matrix A with the columns shifted circularly to the left by j places. As an example, $$A_1 = \left(\frac{1}{2}\right)\begin{bmatrix} 1 & 1 & 1 & 1 \\ 1 & -1 & -1 & 1 \\ -1 & -1 & 1 & 1 \\ -1 & 1 & -1 & 1 \end{bmatrix} \qquad (6)$$

and $A_0 = A_4$. Similarly the other elements of $\Phi$ are constructed from B, C and D. The codebook $\Phi$ is designed as a common codebook for rank-1 ($M_s$=1), rank-2 ($M_s$=2), rank-3 ($M_s$=3) and rank-4 ($M_s$=4) preceding matrices. In the case of rank-1, the first columns of each of the matrices constitute a set of rank-1 codewords, in the case of rank-2 the first two columns of each matrix constitute a set of rank-2 codewords, and so on. In this example, the codebook $\Phi$ has $d_1^*$=0.8660, $d_2^*$=1.0, $d_3^*$=0.8660 and $d_4^*$=2.0. The rank-1 performance compares against $d_1^*$=0.8944 for the best known codebook of the same size with unconstrained alphabet.

The codebook $\Phi$ can be extended to another codebook $\Sigma$ of cardinality 32 (or 5-bits) by finding a set of MUBs denoted as E, F, G, H that are also composed from powers of i but differs from the set A, B, C, D by a constant rotation. The rotation is determined via a random search. An instance of the matrices E, F, G, H are given as $$E = \left(\frac{1}{2}\right)\begin{bmatrix} i & i & i & i \\ 1 & 1 & -1 & -1 \\ -i & i & i & -i \\ -1 & 1 & -1 & 1 \end{bmatrix}, F = \left(\frac{1}{2}\right)\begin{bmatrix} i & i & i & i \\ -1 & -1 & 1 & 1 \\ -1 & 1 & 1 & -1 \\ i & -i & i & -i \end{bmatrix}, \quad (7)$$

$$G = \left(\frac{1}{2}\right)\begin{bmatrix} i & i & i & i \\ -i & -i & i & i \\ -1 & 1 & 1 & -1 \\ 1 & -1 & 1 & -1 \end{bmatrix}, H = \left(\frac{1}{2}\right)\begin{bmatrix} i & i & i & i \\ i & i & -i & -i \\ -i & i & i & -i \\ i & -i & i & -i \end{bmatrix}$$

The codebook $\Sigma$ is then defined as $\Sigma = \{A_0, A_1, A_2, A_3, B_0, B_1, B_2, B_3, C_0, C_1, C_2, C_3, D_0, D_1, D_2, D_3, E_0, E_1, E_2, E_3, F_0, F_1, F_2, F_3, G_0, G_1, G_2, G_3, H_0, H_1, H_2, H_3\}$. The codebook $\Sigma$ has $d_1^*$=0.6124, $d_2^*$=1.0, $d_3^*$=0.6124 and $d_4^*$=1.4142. It has also been possible to construct a codebook only for rank-1 with that increased the rank-1 performance to a value of $d_1^*$=0.7071.

Note that such codebooks can be designed from MUBs whenever the number of transmit antennas is a power of 2. Such codebooks can also be designed for other cases, but not from MUBs. Also, the codebooks mentioned here are non-unique and many such constructions are possible resulting exactly in the same performance.

In the particular case of 3 transmit antennas, a combined codebook for rank-1 and rank-2 of size 16 (or 4-bits) is given as $$\Omega = \left(\frac{1}{\sqrt{3}}\right)\left\{\begin{bmatrix}1\\1\\1\end{bmatrix},\begin{bmatrix}i\\-i\\-i\end{bmatrix},\begin{bmatrix}i\\1\\-i\end{bmatrix},\begin{bmatrix}1\\i\\1\end{bmatrix},\begin{bmatrix}1\\i\\i\end{bmatrix},\begin{bmatrix}i\\-1\\1\end{bmatrix},\right. \quad (8)$$
$$\begin{bmatrix}-1\\-1\\-i\end{bmatrix},\begin{bmatrix}i\\-i\\1\end{bmatrix},\begin{bmatrix}1\\i\\-1\end{bmatrix},\begin{bmatrix}1\\-i\\i\end{bmatrix},\begin{bmatrix}-i\\i\\1\end{bmatrix},$$
$$\left.\begin{bmatrix}-i\\-1\\-i\end{bmatrix},\begin{bmatrix}1\\1\\-i\end{bmatrix},\begin{bmatrix}-i\\-i\\i\end{bmatrix},\begin{bmatrix}-i\\i\\-i\end{bmatrix},\begin{bmatrix}1\\-i\\-i\end{bmatrix}\right\}$$

Note that in this case, a codebook size of 16 is the maximum possible size with an alphabet α. The rank-2 codebook consists of codewords which are orthogonal complements of each codeword of $\Omega$. This is an example of a codebook where the rank-1 codewords are from the alphabet a while the rank-2 codewords are not. This, however, is not a constraint since the codebook search for rank-2 codewords can be equivalently formulated as a search over a codebook of rank-1 codewords (taking orthogonal complements)[1]. This codebook has $d_1^*$=0.6667 and $d_2^*$=0.6667. This compares with the best known codebook that has $d_1^*$=0.7250 and $d_2^*$=0.7250. Note that this codebook is not derived from MUBs and is not applicable to rank-3 codewords.

[1] In general, the equivalency of searching over a codebook of rank r and an equivalent codebook of rank $M_t$−r consisting of the orthogonal complements is true for a large class of codeword selection criteria. Equations pertinent for some selection criterion are provided in the appendix.

The following is a combined codebook for rank-1, rank-2 and rank-3 in the case of 3 transmit antennas and of size 8 (or 3 bits) derived from MUBs. The codewords are composed from a restricted alphabet β={1, x, x*} where x* denotes the conjugate of x. The MUBs in this case are given as $$A = \left(\frac{1}{\sqrt{3}}\right)\begin{bmatrix} 1 & 1 & 1 \\ 1 & x & x^* \\ 1 & x^* & x \end{bmatrix}, B = \left(\frac{1}{\sqrt{3}}\right)\begin{bmatrix} 1 & 1 & 1 \\ x & x^* & 1 \\ x & 1 & x^* \end{bmatrix}, \quad (9)$$

$$C = \left(\frac{1}{\sqrt{3}}\right) = \begin{bmatrix} 1 & 1 & 1 \\ x^* & x & 1 \\ x^* & 1 & x \end{bmatrix}$$

along with the standard basis, where $x=e^{(j2\pi/3)}$. The resulting codebook $\Theta=\{A_0, A_1, A_2, B_0, B_1, B_2, C_0, C_1,\}$ has $d_1^*=0.8165$ and $d_2^*=0.8165$. These compare with the best known codebooks having $d_1^*=0.8606$ and $d_2^*=0.8606$.

The procedure of a multi-rank codebook design from MUBs can be generalized. The method to design a multi-rank codebook $\mathcal{F}$ of size N from MUBs in a dimension D is described in the following. As mentioned before, a rank r precoding matrix may be obtained from the multi-rank codebook by choosing r columns from an element of $\mathcal{F}$.

1. Consider a set of MUBs or a set of sets of MUBs $\mathcal{M}$ of cardinality M in a given dimension D. Denote the j-th element of $\mathcal{M}$ by $M_j$.
2. Define a set of matrix transformations as $f_k$, defined as $Y=f_k(X)$ where Y is obtained from X by circularly shifting the columns of X by k places.
3. Obtain a base codebook with DM elements as $\mathcal{B}=\{f_0(M_0), f_1(M_0), \ldots, f_{D-1}(M_0), f_0(M_1), f_1(M_1), \ldots, f_{D-1}(M_1), \ldots, f_0(M_{M-1}), f_1(M_{M-1}), \ldots, f_{D-1}(M_{M-1})\}$.
4. Obtain the multi-rank codebook $\mathcal{F}$ by choosing N elements from $\mathcal{B}$.

The advantages of a simple codebook such as $\Phi$ or $\Sigma$ are that they reduces codebook search complexity because; a) multiplications are eliminated, replaced by conjugations and negations, and b) there are only N unique columns in a codebook of size N, so the number of dot-products needed to be computed for searching over rank-1 matrices is the same as that for rank-2 or higher ranked matrices. In addition, a simple codebook results in equal-power transmission from all antennas, reduces storage because a single codebook is common for matrices of all ranks, and provides link performance which is near-optimal compared to the best known codebooks constructed from unconstrained alphabet.

In an alternate embodiment, the present invention provides a multi-rank codebook design using householder transformation and where the entries are from a finite alphabet (e.g., powers of i). In this approach, codebooks are designed with good distance properties for multiple ranks using a Householder transform approach. The Householder transform converts a vector into a matrix and the columns of the matrix can be used to design matrix codebooks. The Householder transformation matrix is given as:

$$F(a)=I_{M_t}-2aa^H \quad (10)$$

where $I_{M_t}$ is an $M_t \times M_t$ identity matrix and a is a unit-norm vector.

The codebook design procedure when using the Householder transformation is as follows:

1. Start with a good rank 1 design (unit-norm vectors v(1) through v(N)) designed with finite alphabet entries (e.g., entries that are powers of i scaled so that the vectors are unit norm).
2. Compute the Householder matrix for each rank 1, $H(n)=F(v(n))=I-2*v(n)v^H(n)$ for n=1, ..., N. A subset of H(n) is used for codebook entry n for ranks 2 through $M_t$.
3. Rank $M_t$ matrices are H(1) through H(N)
4. For rank $M_t$–1 search over each set of $M_t$–1 columns of H(1) through H(N) for columns that give best distance.
5. Set m=$M_t$–2.
6. For rank m search over each set of m columns from the subset of columns chosen for rank m+1 for columns that give best distance.
7. If m=2, then stop. Otherwise m=m–1 and go to step 6.

For a specific householder codebook design for four transmit antennas, the design of the codebook starts with a good rank 1 codebook as given in Table 1. This codebook has a distance (0.8660) which is close to the optimal distance (0.8944) even though the alphabet is finite to $\{-1, +1, -j, +j\}$ (note that here j=i). Next the rank 2, 3, and 4 codebooks need to be specified as a function of the Householder transformation matrix of the rank 1 codebook. Let v(n) be the $n^{th}$ rank 1 codebook vector from Table 1 (n=1, ..., 16) and let the Householder matrix associated with vector n be $H(n)=I-2v(n)v^H(n)$ (I is a 4×4 identity matrix). The rank 4 codebook is simply all Householder matrices (n=1, ..., 16). To make the design nice (and lower the computational complexity), the rank 3 matrices are chosen to be a subset of the rank 4 matrices and the rank 2 matrices are chosen to be subsets of the rank 3 matrices. This design is possible without suffering a distance penalty (the rank 2 distance was 0.7071 and the rank 3 distance was 0.8660). Thus all that needs to be specified are the column choices of the Householder matrices and this is given in Table 2.

TABLE 1

Rank 1 Codebook details

| Codebook index | $1^{st}$ element | $2^{nd}$ element | $3^{rd}$ element | $4^{th}$ element |
|---|---|---|---|---|
| 1 | ½ | ½ | ½ | ½ |
| 2 | ½ | ½ | –½ | –½ |
| 3 | ½ | –½ | –½ | ½ |
| 4 | ½ | –½ | ½ | –½ |
| 5 | ½ | –½ | –j/2 | –j/2 |
| 6 | ½ | –½ | j/2 | j/2 |
| 7 | ½ | ½ | j/2 | –j/2 |
| 8 | ½ | ½ | –j/2 | j/2 |
| 9 | ½ | –j/2 | –j/2 | –½ |
| 10 | ½ | –j/2 | j/2 | ½ |
| 11 | ½ | j/2 | j/2 | –½ |
| 12 | ½ | j/2 | –j/2 | ½ |
| 13 | ½ | j/2 | ½ | –j/2 |
| 14 | ½ | j/2 | –½ | j/2 |
| 15 | ½ | –j/2 | –½ | –j/2 |
| 16 | ½ | –j/2 | ½ | j/2 |

TABLE 2

Ranks 2, Rank 3, and Rank 4 Codebook Details

| Codebook index | Householder matrix number (n) | Columns for Rank 2 | Columns for Rank 3 | Columns for Rank 4 |
|---|---|---|---|---|
| 1 | 1 | 2, 4 | 2, 3, 4 | 1, 2, 3, 4 |
| 2 | 2 | 2, 4 | 2, 3, 4 | 1, 2, 3, 4 |
| 3 | 3 | 1, 4 | 1, 3, 4 | 1, 2, 3, 4 |
| 4 | 4 | 3, 4 | 1, 3, 4 | 1, 2, 3, 4 |
| 5 | 5 | 3, 4 | 1, 3, 4 | 1, 2, 3, 4 |
| 6 | 6 | 2, 3 | 1, 2, 3 | 1, 2, 3, 4 |
| 7 | 7 | 2, 3 | 1, 2, 3 | 1, 2, 3, 4 |
| 8 | 8 | 3, 4 | 1, 3, 4 | 1, 2, 3, 4 |
| 9 | 9 | 1, 3 | 1, 2, 3 | 1, 2, 3, 4 |
| 10 | 10 | 1, 3 | 1, 2, 3 | 1, 2, 3, 4 |

TABLE 2-continued

Ranks 2, Rank 3, and Rank 4 Codebook Details

| Codebook index | Householder matrix number (n) | Columns for Rank 2 | Columns for Rank 3 | Columns for Rank 4 |
|---|---|---|---|---|
| 11 | 11 | 1, 2 | 1, 2, 3 | 1, 2, 3, 4 |
| 12 | 12 | 2, 3 | 1, 2, 3 | 1, 2, 3, 4 |
| 13 | 13 | 2, 4 | 2, 3, 4 | 1, 2, 3, 4 |
| 14 | 14 | 2, 4 | 2, 3, 4 | 1, 2, 3, 4 |
| 15 | 15 | 1, 4 | 1, 3, 4 | 1, 2, 3, 4 |
| 16 | 16 | 3, 4 | 1, 3, 4 | 1, 2, 3, 4 |

Figure 6:
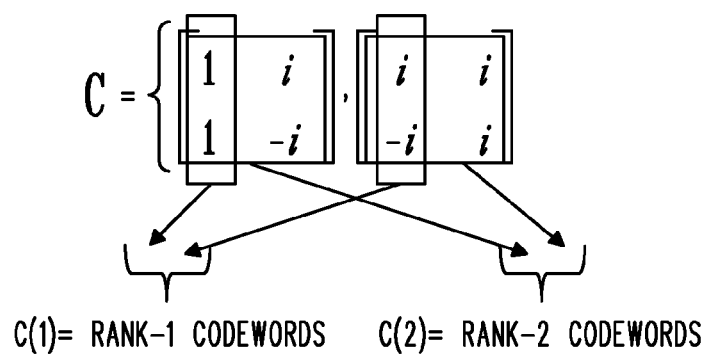
FIG. 6 is a diagram of codebook ranking in accordance with the present invention.

Referring to FIG. 6, an example codebook is shown with two 4×4 codewords (matrices). The first column of each codeword comprises the set of rank-1 codewords which have been designed with good rank-1 distances as detailed above. The entire matrix of each codeword comprises the set of rank-2 codewords which have been designed with good rank-2 distances as detailed above.

The determination of good distances first includes determining the minimum distance between rank pairs, and secondly includes determining the maximum of those minimums. Although only two codewords are shown for demonstration purposes, the present invention envisions that the simplified codebook described herein will comprises 16 to 32 matrices.

The prior art provided rank-dependent codebooks wherein the distance determined for a set of rank-1 codewords is maximized for the rank-1 codewords or the distance determined for a set of rank-2 codewords is maximized for the rank-2 codewords. In contrast, the present invention provides a rank-independent codebook wherein the distance determined for a set of rank-1 codewords and the distance determined for a set of rank-2 codewords are maximized jointly. In addition, the rank-1 results are used determine the rank-2 results, then rank-1 and rank-2 results are used to determine the rank-3 results, etc. Specifically, lower rank codewords are subsets of higher rank codewords, e.g. the rank-1 codeword vector is the first column of the rank-2 codeword matrix, as shown in FIG. 6.

Now the mobile just needs to determine which of the codebook weights to use for each stream. Various power, beamforming, and/or capacity criteria can be used to determine the weights such as are known in the art. An index of the selected pre-coded set of weights is then sent back to the base station, whereupon the base station checks that index against the codebook stored in memory to select the indicated set of weights in subsequent transmissions. For a rank n transmission, the base station uses the first n columns of selected matrices as the beamforming weights

Example

A simulation was performed utilizing the techniques described herein in accordance with the present invention. The simulation results were run with the following conditions:

10 MHz BW (OFDM system with 1024-point FFT, 600 data carrying subcarriers)
2.0 GHz carrier frequency
6-ray TU channel with independent fading
$M_t$=4 Tx antennas at base
$M_r$=2 Rx antennas at mobile
4 bit matrix codebooks (16 matrices)
Codebook signaled with dedicated pilots on the downlink
One codebook vector is selected for two resource blocks (24 subcarriers)
There are no feedback errors
Maximum number of data streams=2 (number of streams chosen to maximize throughput)
14 symbol delay between MCR choice, choice of number of streams, and codebook weight choice and the first transmission
The number of streams and MCR choice for each stream is used on all retransmissions, but the codebook weights are updated for each retransmission
LMMSE (linear MMSE) decoding at mobile
TOA-based channel estimation (for common pilots) across frequency and MMSE interpolation across time
HARQ employing Chase combining (i.e., summed the LLRs from each transmission)
Maximum number of retransmissions=4
42 symbols delay between previous transmission and retransmission
Retransmit only the stream(s) in error (if two streams used on original transmission and only one stream needs to be retransmitted, then dummy data is sent on other stream)
Input word size is 5144 bits (643 bytes)
3GPP turbo code
MCR levels: ⅙ QPSK, ¼ QPSK, ⅓ QPSK, ½ QPSK, ¾ QPSK, ½ 16-QAM, ¾ 16-QAM, ¾ 64-QAM, ⅚ 64-QAM The following codebooks are compared:
1. A constant modulus (prior art) codebook designed for the best rank 2 distance only and the elements of the codebook are restricted to have constant modulus.
2. A non-constant modulus (prior art) codebook designed for the best rank 2 distance only and there are no restrictions on the alphabet of the codebook entries.
3. A low complexity rank-independent codebook with codebook entries restricted to $\{-1, +1, -j, +j\}$, in accordance with the present invention.
4. A non-constant modulus rank-independent codebook with no restrictions on the alphabet of the codebook entries, in accordance with the present invention.

Figure 7:
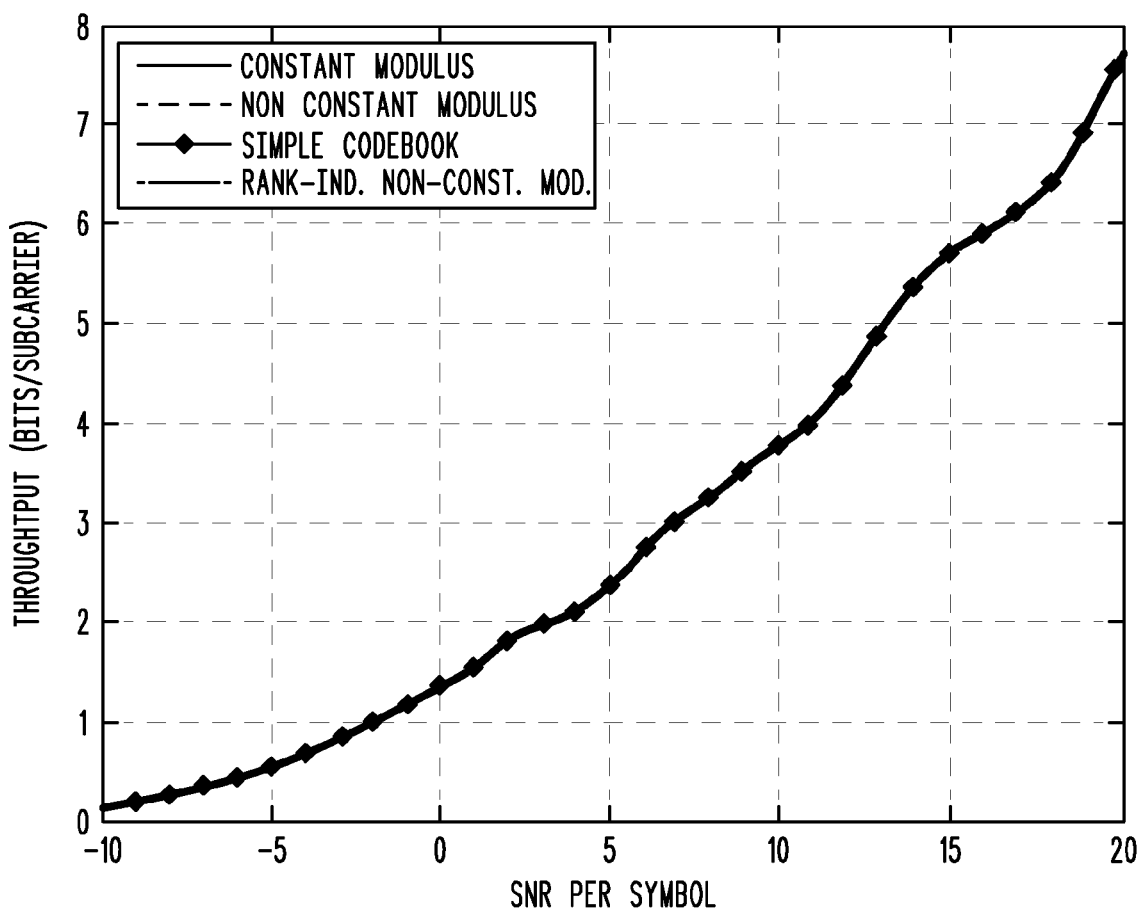
FIG. 7 is a graphical representation of throughput results in accordance with the present invention compared to the prior art.
Figure 8:
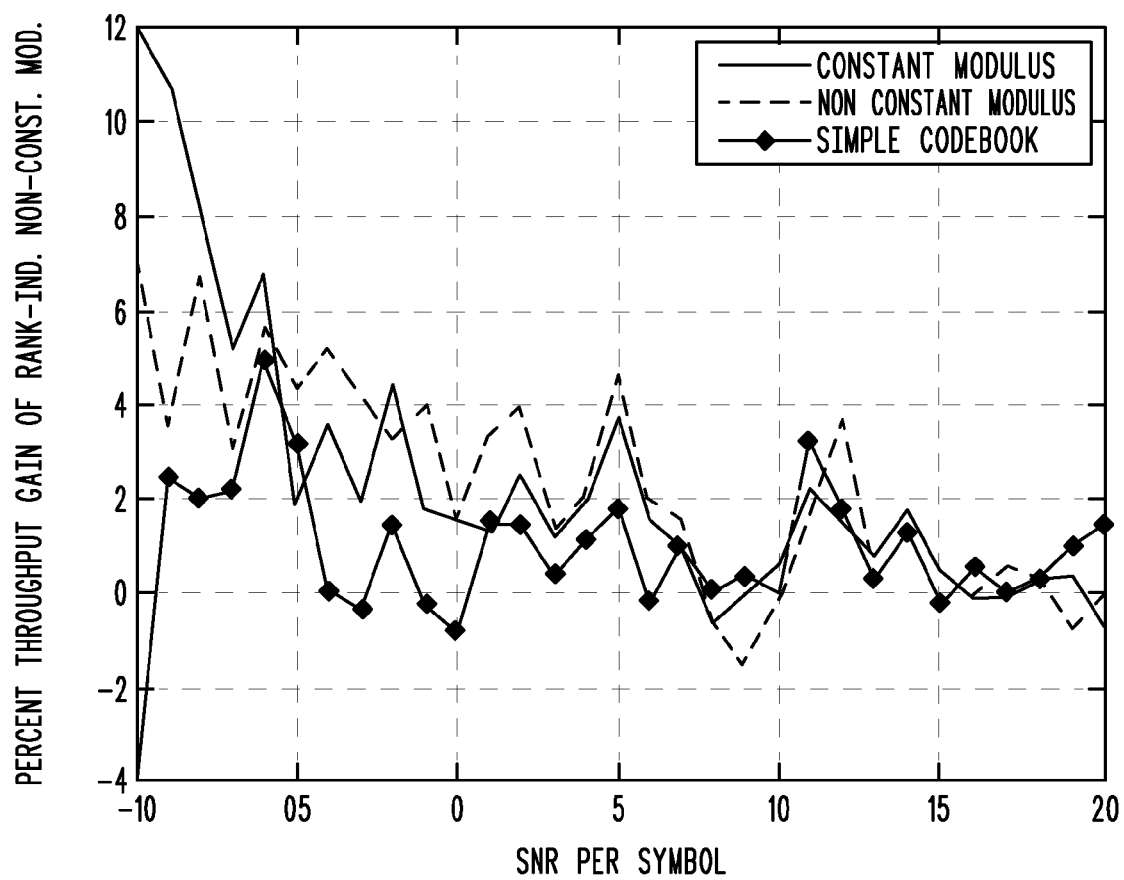
FIG. 8 is a graphical representation of percent of throughput gain results in accordance with the present invention compared to the prior art.

FIG. 7 shows throughput results comparing the various codebooks. The results show that the low complexity rank-independent codebooks have very similar throughput performance as the other codebooks. To see a difference between the methods, FIG. 8 shows the throughput gain (as a function of SNR) of the rank-independent non-constant modulus codebook over the other methods. As expected there is no gain at high SNRs since the rank dependent codebooks were designed with optimal rank 2 distance (and the rank-independent codebooks had excellent rank 2 distance as well). However, at low SNRs, the rank-independent codebooks have a performance gain since these codebooks are designed to have a good rank 1 distance as well as a good rank 2 distance.

Figure 9:
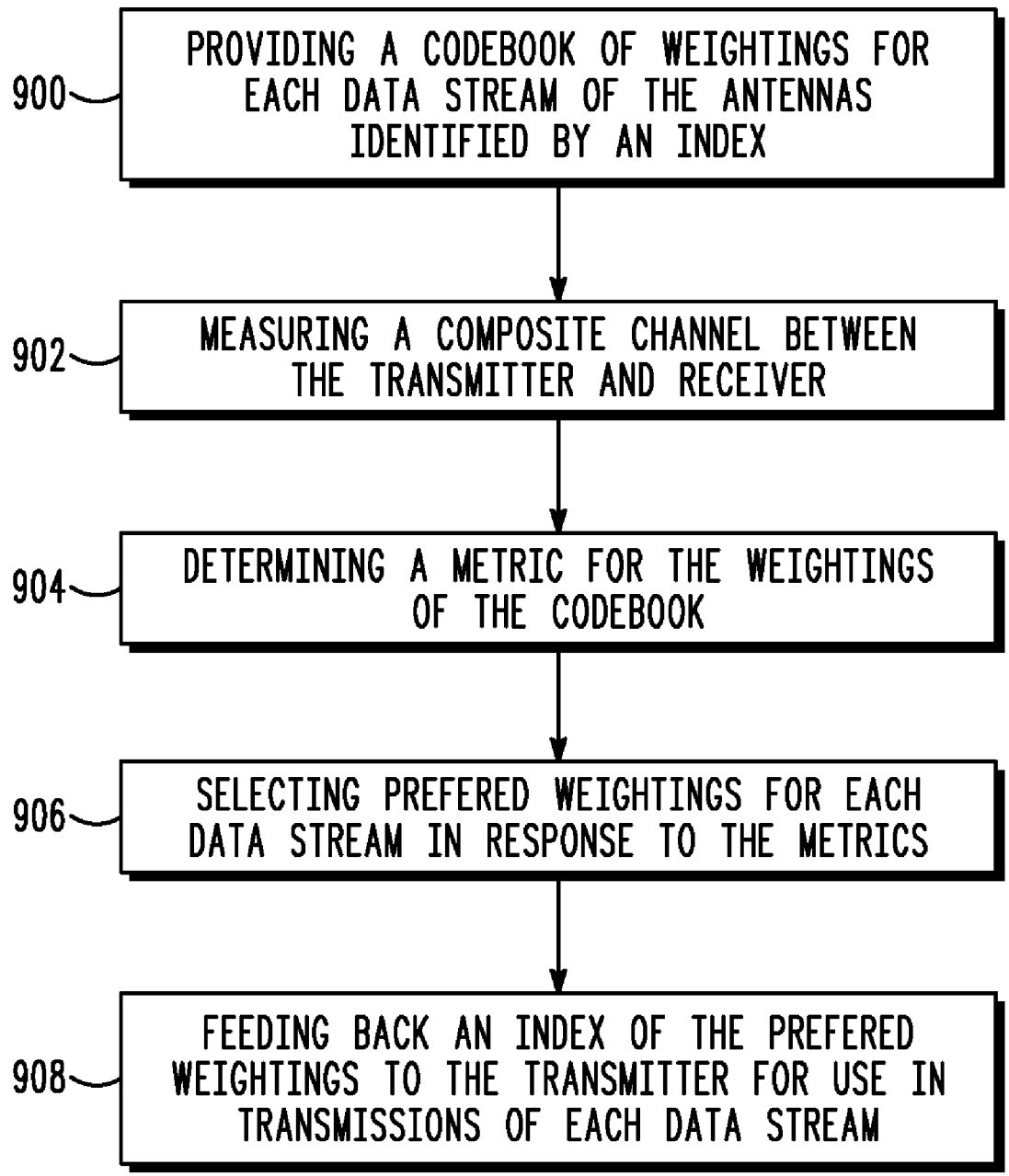
FIG. 9 is a flow chart illustrating a method in accordance with the present invention.

Referring to FIG. 9, the present invention also provides a method for providing feedback for closed-loop transmitting with multiple transmit antennas and multiple receive antennas.

The method includes a first step 900 of providing a codebook containing sets of weightings for each data stream of the multiple transmit antennas with each set of weightings identified by an index known to a transmitter and a receiver. Each set of weightings comprises a vector or matrix codeword for each transmission rank (i.e. number of data streams). The same codebook is utilized for any number of data streams up to the number of transmit antennas (i.e. is rank independent), and resides in both the transmitter and receiver with agreed upon indexes for each codeword.

A novel aspect of the present invention is providing a codebook that only includes entries that utilize a finite alphabet consisting of powers of i where i equals the square root of −1. Yet another novel aspect is providing a codebook with optimal distance for each rank.

Another novel aspect of the present invention is having portions of lower ranked sets of weightings used as subsets of higher ranked sets of weightings in the codebook. In particular, portions of lower ranked sets of weightings are used as subsets of higher ranked sets of weightings in the codebook. Specifically, a column or row of a rank 1 codeword vector is used as a subset of a rank 2 codeword matrix (for example the first column of the rank 2 codeword matrix is the rank 1 codeword vector), and wherein the number of columns or rows is equal to the transmission rank. This sharing of entries reduces computational complexity. Alternatively, the matrix from a second codebook is determined from a vector in the first codebook associated with the codebook index using a Householder transformation.

A next step 902 includes measuring a composite channel between the transmitter and receiver by the receiver using a channel estimator known in the art.

A next step 904 includes determining a performance metric for each set of weightings of the codebook by the receiver. In particular, the performance metric can include quality and capacity characteristics as are known in the art, including interference, SNR, data rate, and the like. Specifically, this step includes calculating a rank 1 performance metric of a set of rank 1 weightings, and calculating a rank 2 performance metric of a set of rank 2 weightings, wherein a subset of the rank 2 weightings include the set of rank 1 weightings. When the codebook is designed with entries that are powers of i (or scaled powers of i) as in the preferred embodiment of the present invention, then the calculation of the performance metrics for all ranks may be done with no multiplications.

A next step 906 includes selecting a preferred set of weightings for each data stream in response to the performance metrics by the receiver. This step includes deciding the rank of the transmission based on the rank 1 and rank 2 performance metrics, and selecting the index of the set of weightings of the decided rank (i.e. selecting the index of the codeword of the decided rank). Preferably, the deciding sub-step includes choosing the rank with the best performance metrics. Preferably, the performance metric can be the quality and capacity characteristics as are known in the art, including interference, SNR, data rate, and the like. Another embodiment of the present invention also envisions that the rank 2 performance metric is a link capacity, and the rank 1 performance metric is a received signal-to-noise ratio (SNR).

A next step 908 includes feeding back an index of the preferred set of weightings by the receiver to the transmitter for use in subsequent transmissions of each data stream from the transmitter. A preferred transmit beamforming codeword for a selected index of a particular transmission rank is contained in each transmit beamforming codeword of greater rank.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for providing feedback for closed-loop transmitting with multiple transmit antennas and multiple receive antennas, the method comprising the steps of:

providing a codebook containing sets of weightings for each data stream of the multiple transmit antennas with each set of weightings identified by an index known to a transmitter, wherein the codebook is utilized for any number of data streams up to a number of transmit antennas;

receiving at the transmitter an index of a preferred set of weightings in the codebook for use in subsequent transmissions of each data stream;

measuring a composite channel between the transmitter and receiver;

determining at least one performance metric for the each set of weightings in the codebook; and selecting the preferred set of weightings for each data stream in response to the performance metrics;

wherein the codebook weightings include entries chosen from a finite alphabet consisting of 0 and powers of i, where i equals the square root of −1;

wherein the determining step includes:

calculating a rank 1 performance metric of a set of rank 1 weightings; and calculating a rank 2 performance metric of a set of rank 2 weightings, wherein a subset of the rank 2 weightings include the set of rank 1 weightings; and wherein the selecting step includes:
deciding a rank of the subsequent transmission based on the rank 1 and rank 2 performance metrics; and
selecting the index of the preferred set of weightings of the rank decided in the deciding substep.

2. The method of claim 1, wherein the codebook weightings include entries chosen from a finite alphabet consisting of 0 and half integer powers of i, where i equals the square root of −1.

3. The method of claim 1, wherein the codebook has an optimal distance for the chosen finite alphabet for each rank.

4. The method of claim 1 wherein the step of measuring a composite channel between the transmitter and receiver comprises
receiving a pilot symbol transmitted from each transmit antenna, and
measuring the composite channel between the transmitter and receiver based on the received pilot symbols transmitted from the each transmit antenna.

5. The method of claim 1 wherein the step of determining the performance metrics consists of determining a performance metric for a plurality of ranks for the each set of weightings in the codebook.

6. The method of claim 1, wherein portions of lower ranked sets of weightings are used as subsets of higher ranked sets of weightings in the codebook.

7. The method of claim 1 wherein the rank 2 performance metric is a link capacity.

8. An apparatus for providing feedback for closed-loop transmitting with multiple transmit antennas and multiple receive antennas, the apparatus comprising:
a codebook containing sets of weightings for each data stream of the multiple transmit antennas with each set of weightings identified by an index known to a transmitter, wherein the codebook is utilized for any number of data streams up to a number of transmit antennas;
a transmitter operable to receive an index of a preferred set of weightings in the codebook and use the index to select the set of weightings for each data stream for subsequent transmissions; and
a receiver that is operable to measure a composite channel between the transmitter and the receiver and determine at least one performance metric for each set of weightings in the codebook, the receiver also operable to select the preferred set of weightings for each data stream in response to the performance metrics, and feedback the index of the preferred set of weightings in the codebook to the transmitter;
wherein the codebook weightings include entries chosen from a finite alphabet consisting only of 0 and powers of i, where i equals the square root of −1; and
wherein the receiver is operable to calculating a rank 1 performance metric of a set of rank 1 weightings and calculating a rank 2 performance metric of a set of rank 2 weightings, wherein a subset of the rank 2 weightings include the set of rank 1 weightings, and wherein the receiver is further operable to decide a rank of the subsequent transmission based on the rank 1 and rank 2 performance metrics and select the index of the preferred set of weightings of the decided rank.

9. The apparatus of claim 8, wherein the codebook weightings include entries chosen from a finite alphabet consisting of 0 and half integer powers of i, where i equals the square root of −1.

10. The apparatus of claim 8, wherein the codebook has an optimal distance for the chosen finite alphabet for each rank.

11. The apparatus of claim 8, wherein portions of lower ranked sets of weightings are used as subsets of higher ranked sets of weightings in the codebook.

* * * * *